United States Patent [15] 3,642,247
Scaramucci [45] Feb. 15, 1972

[54] DISC VALVE ASSEMBLY WITH ROCK-IN VALVE MEMBER

[72] Inventor: Domer Scaramucci, 3245 S. Hattie, Oklahoma City, Okla. 73129

[22] Filed: Dec. 29, 1969

[21] Appl. No.: 888,251

[52] U.S. Cl............................251/148, 251/306, 251/308, 251/315
[51] Int. Cl............................................F16k 5/06
[58] Field of Search..................251/148, 151, 152, 305-315, 251/367, 316, 317

[56] References Cited

UNITED STATES PATENTS

| | | |
|---|---|---|
| 3,348,804 | 10/1967 | Piccardo..........................251/367 X |
| 2,929,606 | 3/1960 | Kaiser..............................251/309 X |
| 3,531,081 | 9/1970 | Scaramucci..........................251/151 |
| 3,534,939 | 10/1970 | Frazier et al..........................251/306 |
| 3,497,178 | 2/1970 | Priese....................................251/174 |
| 3,260,496 | 7/1966 | Borcheldt..............................251/307 |

Primary Examiner—William R. Cline
Attorney—Dunlap, Laney, Hessin & Dougherty

[57] ABSTRACT

A disc valve assembly wherein the valve stems, valve member, and supports for the valve stems are sized and shaped, such that the valve member having the stems attached thereto is installed by rockingly inserting the valve member into the valve body, either individually or along with the valve stem supports.

17 Claims, 12 Drawing Figures

INVENTOR
DOMER SCARAMUCCI

DISC VALVE ASSEMBLY WITH ROCK-IN VALVE MEMBER

CROSS REFERENCE TO RELATED APPLICATIONS

Related subject matter is disclosed in applicant's copending applications entitled "Valve Assembly with Insertable Valve Unit," Ser. No. 763,644, filed Sept. 30, 1968, now U.S. Pat. No. 3,531,081, and "Valve Assembly with Drop-Type Stem," Ser. No. 781,310, filed Dec. 5, 1968.

BACKGROUND OF THE INVENTION

1. Field of the Invention

This invention relates generally to improvements in valves, and more particularly, but not by way of limitation, to an improved disc valve assembly having an insertable valve member.

2. Description of the Prior Art

Both of the above-mentioned copending applications disclose a valve unit for a disc valve including the disc, stems, and supports for the stems, wherein the valve unit is insertable in and supported by an outer housing. Such a structure has been found to be a significant advance in the art, but does present one problem. In larger sizes of disc valves, particularly above 4-inch valves, appreciable bearing-type supports for the disc stems in the valve unit are required, and sufficient support is difficult in the structure disclosed in the first filed application without sacrificing port area. Sufficient support is obtainable in the structure disclosed in the second filed application, but such structure requires manipulation of a valve stem carried by the outer housing, along with requiring a more expensive structure.

SUMMARY OF THE INVENTION

The present invention contemplates a valve assembly having a valve body and a valve member rotatably disposed therein. The valve assembly also includes a first and a second valve stem. The first valve stem is journaled in the valve body to extend at a right angle to the bore in the valve body. A portion of the first valve stem, generally between the upper end and the lower end thereof, is adapted to engage a portion of the valve body, thereby forming a metal-to-metal seal therebetween. The lower end portion of the second valve stem is connected to the upper portion of the valve member and the upper end portion of the second valve stem is adapted to be removably connected to the lower end portion of the first valve stem, thereby providing the interconnection therebetween for turning the valve member from a fully open to a fully closed position. The upper end portion of the second valve stem is sized and shaped to cooperate with the valve member and the lower end portion of the first valve stem, whereby the valve member may be inserted in the valve body at an angle to the vertical and rocked-into position for connection of the first valve stem to the upper end portion thereof, and whereby the interconnection between the first and the second valve stem is disposed in a portion of the valve body generally adjacent the bore therethrough. A bearing is disposed about a portion of the second valve stem, generally between the upper and the lower end thereof. The bearing is adapted to bearingly engage the adjacent portions of the second valve stem. A seat is disposed in the bore of the valve body having a seating surface thereon sized and positioned to seatingly and sealingly engage a portion of the valve member in one position of the valve member.

An object of the invention is to provide a valve assembly having a maximum contacting area between the valve stem and the supporting bearings and yet maintain the size of the valve body at a minimum.

Another object of the invention is to provide a valve assembly having a secondary metal-to-metal seal between one of the valve stems and the valve body, and yet maintain a maximum contacting area between the valve stems and the supporting bearings.

A further object of the invention is to provide a valve assembly adapted to carry increased stem loads without undue sacrifice to the port area through the valve assembly.

A still further object of the invention is to provide a valve assembly having the maximum engaging area between the interconnected valve stems, and yet maintain a maximum bearing engaging area and a maximum port opening.

One additional object of the invention is to provide a valve assembly wherein the valve member having the valve stems connected thereto can be quickly and easily inserted in the valve body.

Other objects and advantages of the invention will be evident from the following detailed description when read in conjunction with the accompanying drawings which illustrate the various embodiments of the invention.

DESCRIPTION OF THE PREFERRED EMBODIMENT

Figure 1:
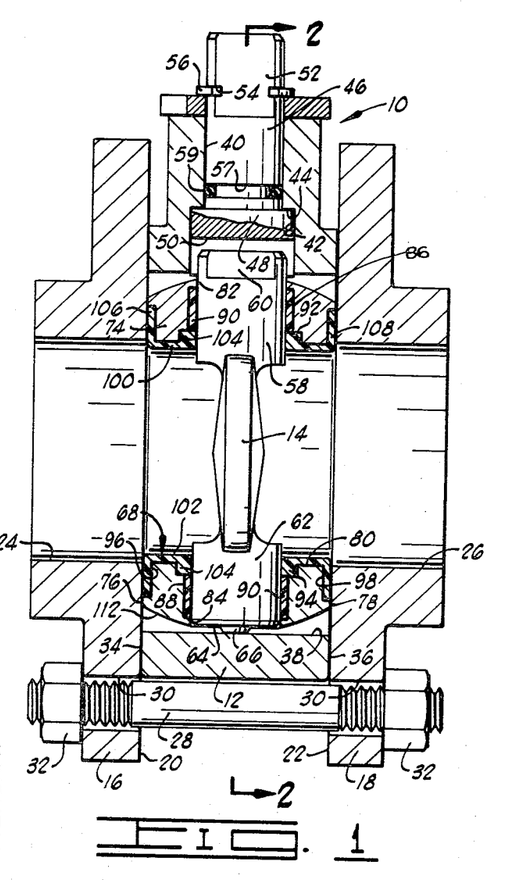
FIG. 1 is a sectional view of a valve assembly, assembled between a pair of flanges.
Figure 2:
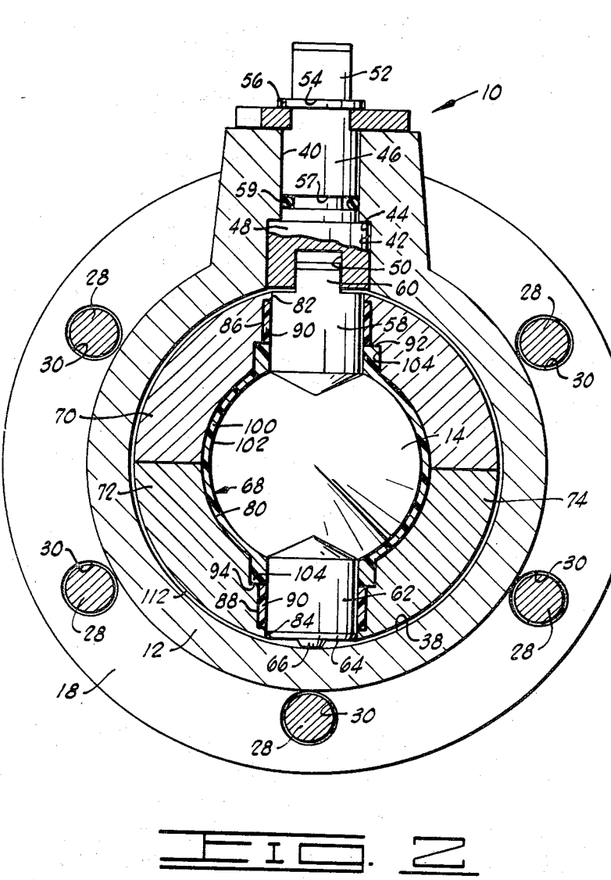
FIG. 2 is a sectional view of the valve assembly of FIG. 1, taken substantially along the lines 2—2 of FIG. 1.
Figures 3, 5:
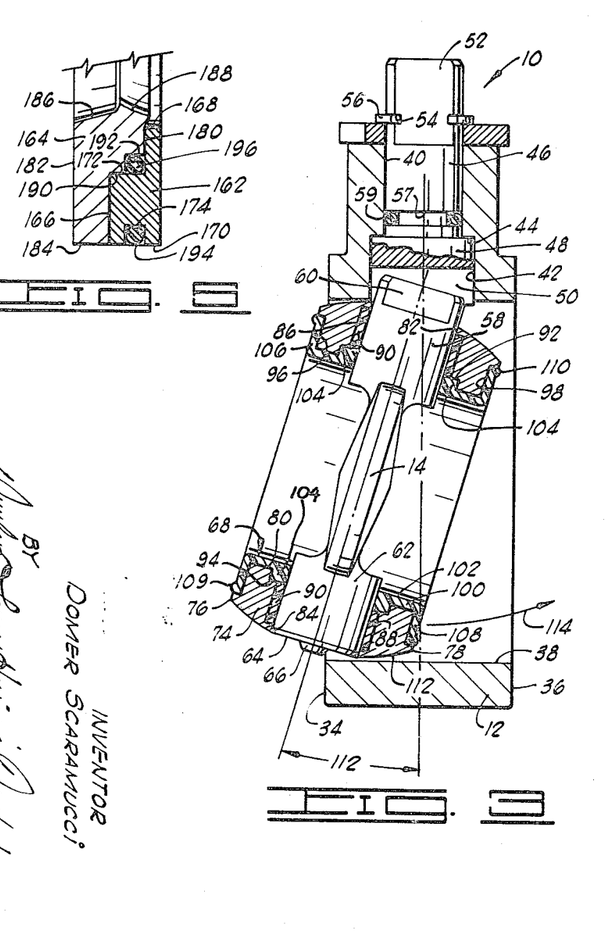
FIG. 3 is a view of the valve assembly of FIG. 1, but showing the disc valve member in one position thereof being rocked into an assembled position in the valve body.
FIG. 5 is an enlarged view showing a portion of the seat assembly of the valve assembly of FIG. 4.

Referring to the drawings in detail, and FIGS. 1, 2 and 3 in particular, shown therein and designated by the general reference character 10 is a valve assembly basically comprising a valve body 12 having a disc valve member 14 rotatably disposed therein.

The valve assembly 10, as shown in FIG. 1, is disposed generally between a pair of flanges 16 and 18, respectively. Each of the flanges 16 and 18 includes an end face 20 or 22, and an opening 24 or 26, respectively. The openings 24 and 26 are axially aligned and sized to receive the ends of adjacent sections of a conduit (not shown).

The valve body 12 and the flanges 16 and 18 are held in an assembled relationship by a plurality of threaded bolts 28 that extend through apertures 30 in the flanges 16 and 18 and about the outer periphery of the valve body 12. Each of the bolts 28 is provided with a pair of threaded nuts 32 that engage the flanges 16 and 18.

The valve body 12 is basically tubular shaped and has opposite end faces 34 and 36 and a bore 38 extending therethrough, intersecting the end faces 34 and 36. An aperture 40 extends transversely through the valve body 12 intersecting the bore 38. A counterbore 42 is formed in the aperture 40 adjacent the bore 38, thereby providing a downwardly facing surface 44 in the valve body 12.

A first valve stem 46 is journaled in the valve body 12 and extends through the transversely extending aperture 40. Thus, the centerline of the first valve stem 40 extends generally at a right angle to the centerline of the bore 38 of the valve body 12. The first valve stem 46 includes a lower flange portion 48 that engages the downwardly facing surface 44 in the valve body 12, encircling the aperture 40, thereby forming a metal-to-metal seal therebetween and limiting the upward movement to the first valve stem 46 in the aperture 40. A slot or groove 50 is formed in the lowermost end portion of the flange portion 48. It should be noted, that the lower flange portion 48 of the first valve stem 46 is sized with respect to the counterbore 42, such that in the assembled position the lower flange portion 48 is disposed entirely within the counterbore 42 and therefore the lowermost end thereof does not extend into the bore 38 of the valve body 12, for reasons to be made more apparent below.

An uppermost end portion 52 of the first valve stem 46 is sized and adapted to receive and cooperate with a valve handle, or other suitable operator (not shown), for turning the first valve stem 46 and thereby rotating the disc valve member 14 from a fully open to a fully closed position, in a manner to be described more fully below. Various forms of valve handles and valve operators are well known in the art and no further description is required herein.

An annular groove 54 is formed in the upper portion 52 of the first valve stem 46, and a retaining ring 56 is disposed in the groove 54. The retaining ring 56 is sized and disposed to engage a portion of the valve body 12, thereby limiting the downward movement of the first valve stem 46 in the aperture 40.

Another annular groove 57 is formed in the first valve stem 46 generally between the upper portion 52 and the flange portion 48 thereof. An O-ring seal member 59 is disposed in the groove 57. The O-ring seal member 59 is sized to sealingly engage the walls of the valve body 12 formed by the aperture 40 and the first valve stem 46, thereby forming a fluidtight seal therebetween.

The disc valve member 14 is rotatably disposed in the bore 38 of the valve body 12. A second valve stem 58 extends upwardly from the disc valve member 14, terminating with an uppermost end portion 60. The uppermost end portion 60 is rectangularly shaped and sized to form a tongue and interconnectingly fit in the slot 50 of the first valve stem 46, thereby providing the interconnection therebetween. It should be noted that the interconnecting portions between the second valve stem 58 and the first valve stem 46 are disposed entirely within the valve body 12, when the valve assembly 10 is in the assembled position, as shown in FIGS. 1 and 2, for reasons to be made more apparent below.

A third valve stem 62 extends downwardly from the disc valve member 14 terminating with a lowermost end 64. A bearing boss 66 is formed on a portion of the lowermost end 64 of the third valve stem 62 and, as shown more clearly in FIG. 2, the bearing boss 66 is sized and disposed to bearingly engage an adjacent portion of the valve body 12 defined by the bore 38 therethrough, and thus rotatably support the disc valve member 14 in the bore 38. In a preferred form, the third valve stem 62 is radially aligned with the second valve stem 58, and the second and third valve stems 58 and 62, respectively, are formed integrally with the disc valve member 14.

The disc valve member 14 is journaly supported in the bore 38 of the valve body 12 by a seat assembly 68. In a preferred form, the seat assembly 68 is split into two separate components along a horizontal centerline thereof, thereby forming an upper component 70 and a lower component 72, as shown more clearly in FIG. 2. The seat 68 is split in the manner as described above to facilitate the assembly of the seat 68 about the disc valve member 14 with the second and third valve stems 58 and 66 connected thereto. It is apparent from the foregoing that in an alternate form, the seat 68 could also be split along a vertical centerline thereof.

The seat 68 includes a seat ring 74 having opposite end faces 76 and 78 and a bore 80 extending axially therethrough intersecting the end faces 76 and 78, thereby forming the valve chamber of the valve assembly 10.

An upper aperture 82 extends transversely through the seat ring 74, intersecting the bore 80 therein. The upper aperture 82 is sized and disposed to journaly receive a portion of the second valve stem 58 which extends therethrough. A lower aperture 84 extends transversely through the seat ring 74 and also intersects the bore 80. The lower aperture 84 is sized and disposed to journaly receive a portion of the third valve stem 62 which extends therethrough. In a preferred form, the upper and lower apertures 82 and 84 are radially aligned.

A counterbore 86 is formed in the upper aperture 82, intersecting the bore 80 through the seat ring 74. A second counterbore 88 is formed in the lower aperture 84 and also intersects the bore 80 through the seat ring 74. The counterbores 86 and 88 are sized and disposed to receive a bearing ring 90, which is disposed in each counterbore 86 and 88, respectively. In a preferred form, each bearing ring 90 is constructed of a suitable bearing material, such as Teflon, and each bearing ring 90 is sized to bearingly engage the respective valve stems 58 or 62.

A recess 92 is formed in the bore 80 of the seat ring 74, generally surrounding and intersecting the upper aperture 82, and a recess 94 is formed in the bore 80 of the seat ring 74, generally surrounding and intersecting the lower aperture 84.

A counterbore 96 is formed in the end 76 of the seat ring 74, and a counterbore 98 is formed in the end 78 of the seat ring 74. Each counterbore 96 and 98 is sized and disposed to encircle the bore 80 in the seat ring 74 at opposite ends of the seat ring 74.

A composite seat 100 is formed in the seat ring 74. In a preferred form, the seat ring 74 is assembled about the disc valve member 14, having the second and the third valve stems 58 and 62 connected thereto, and the composite seat 100 is then molded-in-place in the bearing ring 74. As shown more clearly in FIG. 1, the composite seat 100 has an inner periphery 102. A central portion of the inner periphery 102 is sized to sealingly engage the disc valve member 14 about the outer periphery thereof, when the disc valve member 14 has been rotated to the closed position.

A portion 104 of the composite seat 100 is formed in each of the recesses 92 and 94 of the bearing ring 74, and each portion 104 is sized to sealingly engage the adjacent portions of the second or the third valve stems 58 or 62, respectively. Another portion 106 of the composite seat 100 is formed in the counterbore 96 of the bearing ring 74, and a portion 108 is formed in the counterbore 98 of the bearing ring 74.

As shown more clearly in FIG. 3, an annular bead 109 is formed on the portion 106 of the composite seat 100. The annular bead 109 is sized to extend axially beyond the end face 76 of the bearing ring 74, such that in the assembled position the annular bead 109 sealingly engages the end face 20 of the flange 16, thereby forming a fluid-type seal therebetween. An annular bead 110 is also formed on the portion 108 of the composite seat 100. As shown more clearly in FIG. 3, the annular bead 110 is sized to extend axially beyond the end face 78 of the seat ring 74 and to sealingly engage the end face 22 of the flange 18, thereby forming a fluid-type seal therebetween.

As shown in FIGS. 1, 2 and 3, the seat ring 74 has an outer periphery 112 curved generally on the arc of a circle having its axis extending at a right angle to the centerline of the bore 38. The curvature of the outer periphery 112 is sized such that the disc valve member 14 having the seat assembly 68 assembled thereabout can be rocked into an assembled position in the valve body 12, in the manner which will be described more fully below.

OPERATION OF FIGS. 1, 2, and 3

In the assembly of the valve assembly 10, the first valve stem 46 is first inserted upwardly through the aperture 40 in the valve body 12 to an assembled position, as shown in FIGS. 1 and 2. The valve operator may then be assembled to the upper end portion 52 of the first valve stem 46.

The seat assembly 68 is then assembled about the disc valve member 14 having the second and third valve stems 58 and 62 connected thereto. The composite seat 100 is then formed on the seat ring 74.

The disc valve member 14 having the seat assembly 68 assembled thereabout is then tilted at an angle to the vertical and inserted axially into the bore 38 at the valve body 12, to a position generally, as shown in FIG. 3. In this position, a portion of the rectangular end 60 of the second valve stem 58 is disposed in a portion of the slot 50 of the first valve stem 46, and the disc valve member 14 and the seat assembly 68 are tilted at an angle 112. The disc valve member 14 and the seat assembly 68 are then rocked in a direction 114, thereby moving the disc valve member 14 and the seat assembly 68 to the assembled position as shown in FIGS. 1 and 2.

As the disc valve member 14 is rocked in the direction 114, it is apparent that the remaining portion of the rectangular end 60 of the second valve stem 58 will be rockingly disposed in the slot 50, thereby providing the total interconnection therebetween. In this position the boss 66 of the third valve stem 62 will bearingly contact a portion of the valve body 12 formed by the bore 38 therethrough.

Due to the interconnection between the first valve stem 46 and the disc valve member 14, when the valve operator (not shown) is turned thereby rotating the first valve stem 46 in the aperture 40, the rotating motion is transmitted to the disc valve member 14. The disc valve member 14 may thus be rotated from an open position, that is, a position wherein the disc valve member 14 is in line with the bore 38 in the valve body 12, to a closed position, that is, a position wherein the disc valve member 14 is transverse to the axis of the bore 38 in the valve body 12.

As shown more clearly in FIG. 2, the seat assembly 100 sealingly engages the disc valve member 14 about the entire periphery thereof when the disc valve member 14 has been rotated to the closed position. The seat assembly 100 also provides the sealing engagement between the seat ring 74 and the flange 16 and 18, and the primary stem seals about the second and third valve stems 58 and 62, respectively, thereby forming a fluidtight seal therebetween.

The metal-to-metal engagement between the lower flange portion 48 and the downwardly facing surface 44 in the valve body 12 provides a metal-to-metal seal therebetween and, in one form, provides a secondary-type stem seal in the event the seals provided by the O-ring 59 an the portion 104 of the seat 100 are destroyed or damaged.

It is apparent from the foregoing that the fluid flowing through the valve assembly 10 is virtually isolated by the composite seat 100, and will not be in contact with the valve body 12. This construction is particularly important in those applications which require that the components of the valve assembly in contact with the fluid flowing through the valve assembly be constructed of an expensive- or exotic-type material. Since the valve body 12 will not be in contact with the fluid flowing through the valve assembly 10, the valve body 12 may be constructed of any material such as cast iron or cast steel, the main considerations being the strength characteristics for the valve assembly 10.

Since the disc valve member 14 and the seat assembly 68 are rocked into position, in a manner as described before, it is apparent that the lower end portion 48 of the first valve stem does not have to extend into the bore 38 of the valve body 12 so that the second valve stem 58 may be interconnectingly assembled to the first valve stem 46. This particular construction permits more stem engagement with the bearing surfaces without the necessity of having to enlarge the valve body. This is particularly important in the larger sizes of valve assemblies where it is important to get sufficient bearing contact area to support the increased stem loads without undue sacrifice of the port area through the valve assemblies. In other words, the bore 38 does not have to be enlarged to accommodate the interconnecting portions between the first and second valve stems 46 and 58. The sizing of the disc valve member 14 and the second and the third valve stems 58 and 62, can thus be balanced to achieve a maximum bearing contacting area about the stems considering the port area desired through the valve assembly 10. In other words, the valve assembly 10 has a maximum port and bearing area, similar to valve assemblies utilizing a drop-type stem, and yet has a stem journaled in the valve body providing a metal-to-metal secondary sealing engagement.

Figure 4:
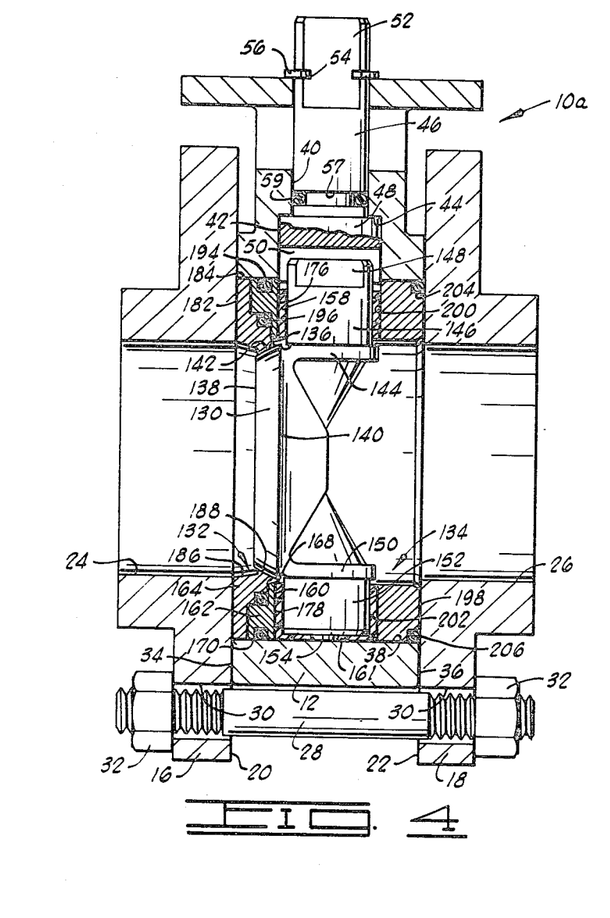
FIG. 4 is a view similar to FIG. 1, but showing a modified valve assembly.
Figure 6:
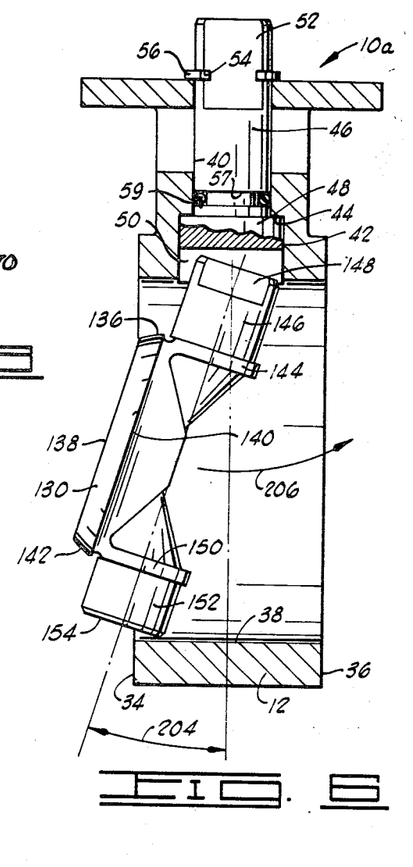
FIG. 6 is a view similar to FIG. 3, but showing the disc valve member of the valve assembly of FIG. 4 in one position thereof being rocked into an assembled position in the valve body.

EMBODIMENTS OF FIGS. 4, 5 AND 6

The modified valve assembly 10a, shown in FIGS. 4, 5 and 6, is constructed similar to the valve assembly 10, the salient differences being an offset type of disc valve member 130, an axially insertable seat assembly 132 and a retaining ring 134.

The disc valve member 130 is rotatably disposed in the bore 38 of the valve body 12, and is preferably constructed of a relatively rigid material and is adapted to be rocked into an assembled position, in a manner to be described more fully below. The disc valve member 130 is generally circular shaped, having an outer periphery 136 and opposite end faces 138 and 140. A seating surface 142, conforming to a portion of a sphere, is formed on the outer periphery 136.

An upper flange 144 is formed on the end face 140 of the disc valve member 130, and extends a distance axially therefrom. A first valve stem 146 is formed on the upper edge of the upper flange 144, and extends in a generally upward direction radially therefrom, terminating with an upper end portion 148. The upper end portion 148 of the second valve stem 146 is rectangularly shaped, and is sized to interconnectingly fit into the slot 50 of the first valve stem 46, thereby providing the interconnection therebetween.

A lower flange 150 is formed on the end face 140 of the disc valve member 130, and extends a distance axially therefrom. The lower flange 150 is disposed generally near the outer periphery 136, generally opposite the upper flange 144. A third valve stem 152 is formed on the lower end of the lower flange 150, and extends in a generally downward direction radially therefrom, terminating with a lower end 154. As shown more clearly in FIG. 4, the second and third valve stems 146 and 152, respectively, are radially aligned, and each is sized to journaly support the disc valve member 130 in the valve body 12.

As shown more clearly in FIG. 4, the first and second valve stems 146 and 152 are sized and disposed on the disc valve member 130, such that the seating surface 142 is axially offset from the turning axis of the valve assembly 10a when the disc valve member 130 is rotated to the closed position. This particular construction has been found to be desirable, particularly in high pressure applications due to the reduced requirement for stem seals.

A cylindrically shaped bearing ring 158 is disposed about a portion of the second valve stem 146, and a second bearing ring 160 is disposed about a portion of the third valve stem 152. In a preferred form, each bearing ring 158 and 160 is sized to bearingly engage the respective valve stem 146 or 152. The bearing ring 160 has a flange portion 161 formed on one end thereof. The flange portion 161 is sized to extend a distance over the lower end 154 of the third valve stem 152, and to bearingly support the third valve stem 152 and thus the disc valve member 130 in an assembled position, as shown in FIG. 4. It should be noted that in one form, each bearing ring 158 and 160 may be split along a vertical centerline thereof to facilitate the assembly of the valve.

The seat assembly 132 basically comprises a retaining ring 162 and a seat ring 164. The retaining ring 162 and the seat ring 164 are each sized to be axially inserted into an assembled position in the valve body 12.

The retaining ring 162 may be constructed of a metal or reinforced plastic and, as shown more clearly in FIG. 5, has a nonvalve member end 166, an inner periphery 168 and an outer periphery 170. An annular groove 172 is formed in the nonvalve member end 166, intersecting a portion of the inner periphery 168, and an annular groove 174 is formed in a central portion of the outer periphery 170.

An upper aperture 176 (one-half of an aperture) is formed in the end of the retaining ring 162, opposite the nonvalve member end 166 thereof, and a lower aperture portion 178 (one-half of an aperture) is also formed in the end of the retaining ring 162, opposite the nonvalve member end 166 thereof. The upper and the lower aperture portions 176 and 178 are each sized and disposed to matingly engage a portion of the respective bearing rings 158 or 160.

As shown more clearly in FIG. 5, the seat ring 164 has a valve member end 180, a nonvalve member end 182, an outer periphery 184, and an inner periphery 186. A seating surface 188 is formed on a portion of the inner periphery 186 of the seat ring 164. The seating surface 188 is sized and disposed to seatingly engage the seating surface 142 formed about the outer periphery of the disc valve member 130, when the disc valve member 130 has been rotated to a closed position, as shown in FIG. 4.

As shown more clearly in FIG. 5, an annular recess 190 is formed in the valve member end 180 of the seat ring 164, intersecting a portion of the outer periphery 184 thereof. A second annular recess 192 is formed in the valve member end 180 of the seat ring 164, intersecting a portion of the cylindrical wall formed by the recess 190 therein. In the assembled position, the wall formed by the recess 190 cooperates with the wall formed by the recess 172 of the retaining ring 162 to positively locate seat ring 164 in an axial and a radial direction in the valve body 12 with respect to the retaining ring 162.

An O-ring seal member 194 is disposed in the recess 174 of the retaining ring 162. The O-ring 194 is sized and disposed to sealingly engage an adjacent portion of the retaining ring 162 and an adjacent portion of the valve body 12 defined by the bore 38 therethrough, thereby forming a fluid-type seal therebetween. A second O-ring 196 is disposed in the recess 192 of the seat ring 164. The O-ring 196 is sized and disposed to sealingly engage the adjacent portions of the seat ring 164 and the retaining ring 162, thereby forming a fluid-type seal therebetween.

The retaining ring 134 is sized to be axially inserted in the valve body 12 to an assembled position, as shown in FIG. 4. The retaining ring 134 has a nonvalve member end 198 and includes an upper aperture portion 200 (one-half of an aperture) and a lower aperture portion 202 (one-half of an aperture). The upper and the lower apertures 200 and 202 are each formed in the end of the retaining ring 134 opposite the nonvalve member end 198 thereof. Each aperture 200 or 202 is sized to matingly engage an adjacent portion of the respective bearing ring 158 or 160.

An annular recess 204 is formed in the nonvalve member end 198 of the retaining ring 134, intersecting a portion of the outer periphery thereof. An O-ring 206 is disposed in the recess 204, and the O-ring 206 is sized to sealingly engage the adjacent portions of the retaining ring 134, the valve body 12 and the end face 22 of the flange 18, thereby forming a fluidtight seal therebetween.

In the assembled position, as shown in FIG. 4, the nonvalve member end 182 of the seat ring 164 is coplanar with the end face 34 of the valve body 12 and the nonvalve member end 198 of the ring 134 is coplanar with the end face 36 of the valve body 12. The flanges 16 and 18 will therefore engage the nonvalve member ends 182 and 198 of the seat ring 164 and the retaining ring 134, respectively, thereby cooperating to retain the seat assembly 132 and the retaining ring 134 in an assembled position.

OPERATION OF FIGS. 4, 5 AND 6

The valve assembly 10a will operate similar to the valve assembly 10, described before, one salient difference being that the seat assemblies are not assembled about the disc valve member 130 as the disc valve member 130 is being rocked into position.

As shown more clearly in FIG. 6, the disc valve member 130 is tilted and inserted axially into the bore 38 of the valve body 12, to a position generally as shown in FIG. 6. In this position a portion of the rectangularly shaped end 148 of the second valve stem 146 is disposed in a portion of the slot 50 of the first valve stem 46, and the disc valve member 130 is tilted at an angle 204. The disc valve member 130 is then rocked in a general direction 206, thereby moving the disc valve member 130 to the assembled position, as shown in FIG. 4. As the disc valve member 130 is rocked in the direction 206, it is apparent that the remaining portion of the rectangular end 148 of the second valve stem 146 will become disposed in the slot 50, thereby providing the total interconnection between the first valve stem 46 and the disc valve member 130.

In one form, the bearing ring 158 is disposed about the second valve stem 146 prior to rocking the disc valve member 130 into the assembled position. In an alternate form, the bearing ring 158 is split along a vertical centerline. In this latter form, the disc valve member 130 may be rocked into the assembled position and the bearing ring 158 then inserted axially into an assembled position about the second valve stem 146.

After the disc valve member 130 has been rocked into the assembled position, the bearing ring 160 is assembled about the third valve stem 152. In the assembled position as shown in FIG. 4, the flange portion 161 of the bearing ring 160 is disposed generally between the end 154 of the third valve stem 152 and the valve body 12 and therefore cooperates to support the disc valve member 130 in the bore 38 of the valve body 12. The seat assembly 132 and the retaining ring 134 are then inserted axially into the bore 38 of the valve body 12 to the assembled position.

When the valve member 130 is rotated to the closed position, as shown in FIG. 4, the seating surface 188 will sealingly and seatingly engage the seating surface 142 about the disc valve member 130, thereby preventing the flow of fluid through the valve assembly 10.

The seat assembly 132 is sized such that the engagement of the nonvalve member end 182 with the end face 20 of the flange 16 forms a fluidtight seal therebetween. The O-ring 206 provides the sealing engagement between the flange 18, the valve body 12, and the retaining ring 134.

It is apparent from the foregoing that the valve assembly 10a retains most of the advantages of the valve assembly 10, described before, and in addition provides a valve assembly having axially insertable seat assemblies. This particular construction permits the seat assemblies to be removed for repair or replacement without the necessity of having to remove the disc valve member 130. Also, this construction provides additional bearing support for the valve stems 146 and 152 since the seat assembly 132 and the ring 134 have uniform outer diameters.

Figure 7:
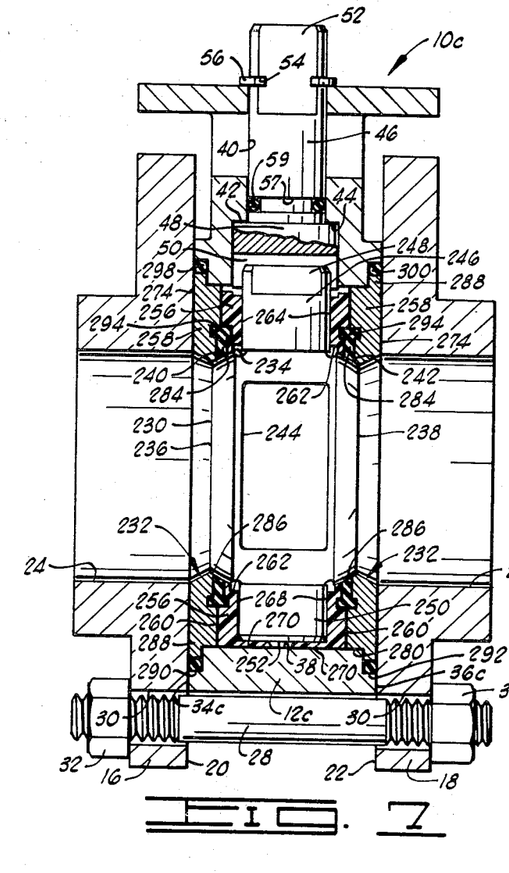
FIG. 7 is a sectional view similar to FIG. 1, but showing another modified valve assembly.
Figure 8:
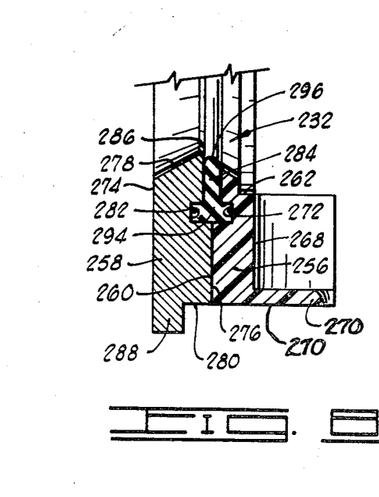
FIG. 8 is an enlarged view showing a portion of the seat assembly of the valve assembly of FIG. 7.

EMBODIMENTS OF FIGS. 7 AND 8

The valve assembly 10c, shown in FIG. 7, is constructed similar to the valve assemblies 10 and 10a described before, the salient differences being that the valve assembly 10c has a disc valve member 230 rotatably disposed therein and an axially insertable upstream and a downstream seat assembly 232.

The disc valve member 230 is preferably constructed of relatively rigid material and has an outer periphery 234 and upstream and downstream end faces 236 and 238, respectively. An upstream seating surface 240 is formed on a portion of the outer periphery 234 and a portion of the upstream end face 236 of the disc valve member 230. A downstream seating surface 242 is formed on a portion of the outer periphery 234 and a portion of the downstream end face 238 of the disc valve member 230. In a preferred form, the seating surfaces 240 and 242 are shaped to conform to portions of a sphere having its center in the center of the disc valve member 230.

The disc valve member 230 has a port opening 244 which extends therethrough, and is disposed generally between the upstream and downstream end faces 236 and 238, respectively, of the disc valve member 230. Thus the port opening 244 is positioned such that when the disc valve member 230 has been rotated to the open position, the port opening 244 is axially aligned with the bore 38 in the valve body 12c. The port opening 244 therefore provides an additional opening through which fluid may flow when the valve assembly 10c is in the open position.

A second valve stem 246 is formed on a portion of the outer periphery 234 of the disc valve member 230 and extends upwardly therefrom. An uppermost end portion 248 of the second valve stem 246 is rectangularly shaped and sized to interconnectingly fit in the slot 50 in the first valve stem 46 and thereby provide the interconnection therebetween.

A third valve stem 250 is formed on a lower portion of the outer periphery 234 of the disc valve member 230 and extends a distance generally downwardly therefrom, terminating with a lower end 252. In a preferred form, the third valve stem 250 is radially aligned with the second valve stem 246, and the second and third valve stems 246 and 250, respectively, are formed integrally with the disc valve member 230.

In a preferred form, and as shown in FIG. 7, the upstream and downstream seat assemblies 232 are of identical construction, and each includes an annular bearing ring 256 and an annular seat ring 258. Each bearing ring 256 and each seat ring 258 is sized to be axially insertable in the bore 38 of the valve body 12c.

Each bearing ring 256 includes a nonvalve member end 260 and an inner periphery 262. A portion 264 (one-half) of an aperture is formed in the upper portion of each bearing ring 256 generally adjacent and intersecting the end thereof opposite the nonvalve member end 260. A second portion 268 (one-half) of an aperture is formed in the lower portion of each bearing ring 256, adjacent and intersecting the end thereof opposite the nonvalve member 260. The aperture portions 264 and 268 are each sized such that, in an assembled position, as shown in FIG. 7, the aperture portions 264 of the bearing rings 256 cooperate to encompass and bearingly engage a portion of the second valve stem 246 about the entire outer periphery thereof, and the aperture portions 268 of the bearing rings 256 cooperate to encompass and bearingly engage a portion of the third valve stem 250 about the entire outer periphery thereof.

A flange portion 270 is formed on each bearing ring 256. Each flange portion 270 extends axially from the respective bearing ring 270, generally adjacent, the outer periphery thereof, and about the aperture portion 268 thereof. The flange portions 270 are sized and disposed such that, in the assembled position, each flange portion 270 is disposed between a portion of the lower end 252 of the third valve stem 250 and the valve body 12c, the flange portions 270 thereby cooperating to support the disc valve member 230 in an assembled position in the valve body 12c.

As shown more clearly in FIG. 8, each bearing ring 256 also includes an annular L-shaped recess 272 formed in a portion of the nonvalve member end 260 thereof and intersecting a portion of the inner periphery 262 thereof. The L-shaped recess 272 in each bearing ring 256 is sized to receive and support a portion of a seal member, in a manner to be more fully described below.

Each seat ring 258 has a nonvalve member end 274, a valve member end 276, an inner periphery 278 and an outer periphery 280. The outer periphery 280 of each seat ring 258 is sized such that each seat ring 258 may be inserted axially into the respective end of the valve body 12c.

An annular L-shaped recess 282 is formed, in a portion of the valve member end 276 of each seat ring 258, and a portion of each recess 282 intersects a portion of the inner periphery 278. Each L-shaped recess 282 is sized and disposed to cooperate with the L-shaped recess 272 in one of the bearing rings 256 retain a seal member 284 in sealing position therebetween.

A seating surface 286 is formed on a portion of the inner periphery 278 of each seat ring 258, intersecting a portion of the respective recess 282 therein. Each seating surface 286 is sized and disposed to seatingly engage one of the seating surfaces 240 or 242 of the disc valve member 230, when the disc valve member 230 has been turned to the closed position.

A counterbore 290 is formed about the bore 38 of the valve body 12c, intersecting a portion of the end face 34c thereof, and a counterbore 292 is formed in the opposite end of the bore 38. Each counterbore 290 and 292 is sized to cooperate with a flange portion 288 of the respective seat rings 258 to limit the inward axial movement of the seat rings 258, and to position each seat ring 258 in the assembled position, as shown in FIG. 7.

As shown in FIG. 8, each seal member 284 has a flange portion 294 extending about its outer periphery, and a disc-engaging portion 296 which extends generally perpendicularly from the respective flange portion 294. Each flange portion 294 is sized such that, in the assembled position, a portion of each flange portion 294 extends into a portion of the L-shaped recess 272 of the adjacent bearing ring 256, and another portion of each flange portion 294 extends into a portion of the L-shaped recess 282 of the adjacent seat ring 258.

In the assembled position, as shown in FIGS. 7 and 8, the disc-engaging portion 296 of each seal member 284 is sized to extend radially inwardly beyond the seating surface 286 of the respective seat ring 258. Each disc-engaging portion 296 is therefore sized and disposed such that a portion thereof sealingly engages one of the seating surfaces 240 or 242 of the disc valve member 230, when the disc valve member 230 has been rotated to the closed position.

An O-ring seal member 298 is disposed in the counterbore 290, and an O-ring seal member 300 is disposed in the counterbore 292. The O-ring 298 is sized and disposed to sealingly engage a portion of the end face 20 of the flange 16, an adjacent portion of the valve body 12c, and the outer periphery of the flange portion 288 of the adjacent seal ring 258, thereby forming a fluidtight seal therebetween. The O-ring 300 is sized and disposed to sealingly engage a portion of the end face 22 of the flange 18, an adjacent portion of the valve body 12c, and the outer periphery of the flange portion 288 of the adjacent seat ring 258, thereby forming a fluidtight seal therebetween.

OPERATION OF FIGS. 7 AND 8

The valve assembly 10c will operate similar to the valve assemblies 10 and 10a described before. In fact, the valve member 230 is sized such that it can be rocked into an assembled position in a manner similar to that described before with respect to the disc valve member 130 of the valve assembly 10a. The seat assemblies 232 are each sized to be axially inserted into the valve body 12c, to an assembled position, as shown in FIG. 7.

The seat assemblies 232 provide what may be referred to as full circle sealing at the respective ends of the disc valve member 230, that is, a portion of the disc-engaging portion 296 of each seal member 284 is in engagement with one of the seating surfaces 240 or 242 about an entire periphery thereof. This full circle sealing provides maximum sealing effectiveness and thus assures a fluidtight seal between the disc valve member 230 and the valve body 12c.

The disc valve member 230 is effectively sealed in an upstream and downstream end thereof by the sealing engagement between the upstream and downstream seat assemblies 232. The effect of the disc valve member 230 being sealed, or rather in sealing engagement at both the upstream and downstream ends thereof, assures a more positive sealing effectiveness. This particular feature of the valve assembly 10c may be referred to as a "positive double sealing feature."

The positive double sealing feature is generally utilized in a ball-type valve, and to some extent in gate-type valves. It is chiefly for this reason that ball-type valves are used in high-pressure applications requiring a fluidtight seal.

It is therefore apparent from the foregoing that the valve assembly 10c retains most of the features described before with respect to the valve assemblies 10 and 10a and yet the valve assembly 10c, and more particularly, the upstream and downstream seat assemblies 232 in cooperation with the disc valve member 230, provide a double sealing feature, which is particularly useful in high pressure applications, and yet maintain the size of the valve assembly and the size of the disc valve member at a minimum with respect to a given flow port area, thereby resulting in a substantial material and space savings.

Figures 9, 10, 11, 12:
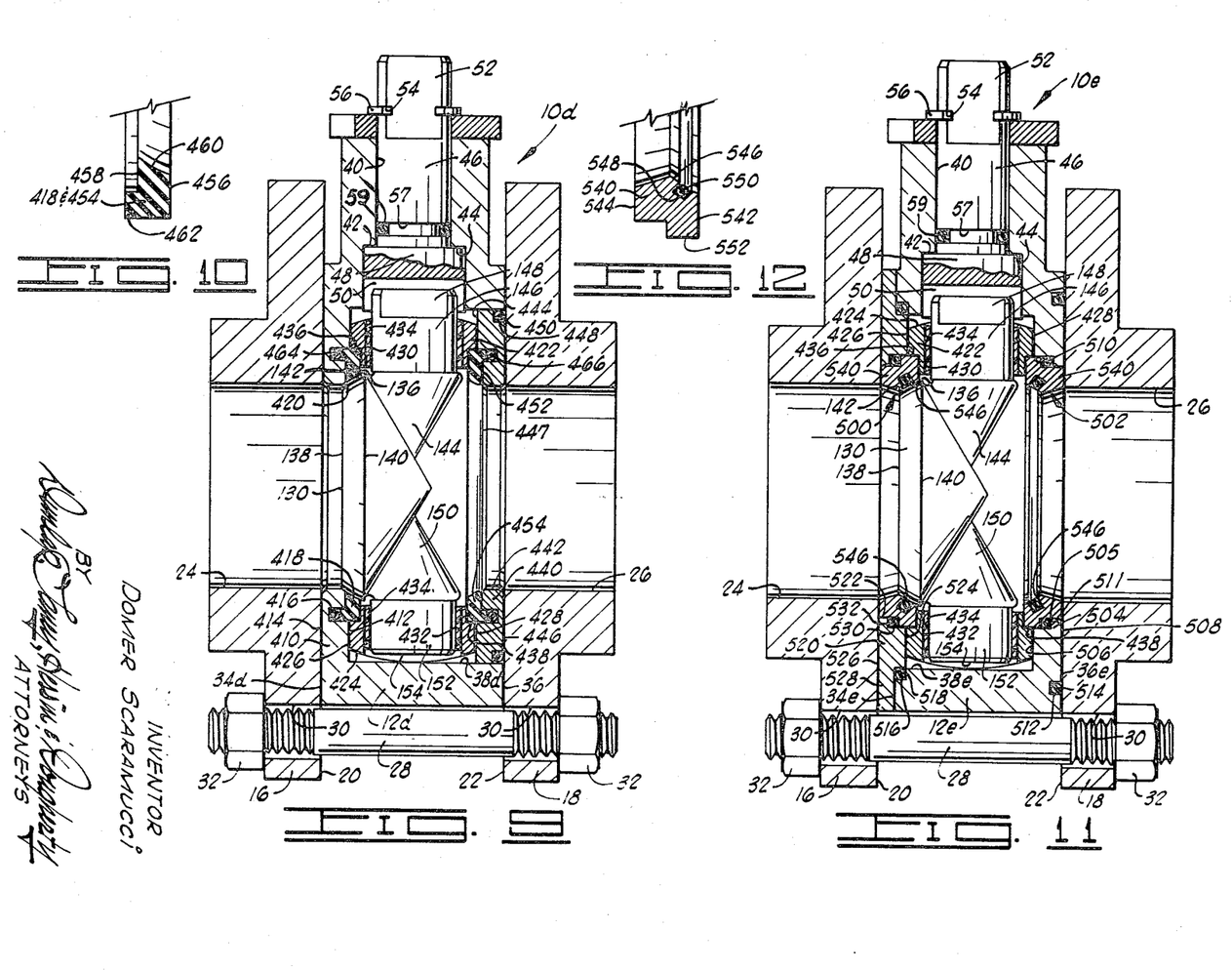
FIG. 9 is a sectional view of yet another modified valve assembly.
FIG. 10 is an enlarged view of a portion of the seal member of the valve assembly of FIG. 9.
FIG. 11 is a sectional view of yet another modified valve assembly.
FIG. 12 is an enlarged view of a portion of the seat assembly of the valve assembly of FIG. 11.

EMBODIMENTS OF FIGS. 9 AND 10

The valve assembly 10d, shown in FIG. 9, is constructed similar to the valve assemblies 10 and 10a described before.

A radially inwardly extending flange ring 410 is formed in the bore 38d of the valve body 12d, generally adjacent the end face 34d thereof. The flange ring 410 has a valve member end 412 and a nonvalve member end 414. The nonvalve member end 414 is coplanar with the end face 34d of the valve body 12d, as shown in FIG. 9.

An annular L-shaped recess 416 is formed in the valve member end 412 of the flange ring 410. The recess 416 is sized and disposed in the valve body 12d to receive and cooperate with a seal ring 418, in a manner to be more fully described below.

A seating surface 410 is formed on a portion of the valve member end 412 of the flange ring 410, generally adjacent and intersecting the inner periphery thereof. The seating surface 420 is shaped and disposed to seatingly engage the seating surface 142 of the disc valve number 130 is one position thereof.

An annular bearing ring 422 is disposed about the disc valve member 130. The bearing ring 422 has an outer periphery 424 and opposite ends 426 and 428. As shown in FIG. 9, the opposite ends 426 and 428 are each substantially flat, for reasons which will be made apparent below. In a preferred form, the bearing ring 422 is split along a vertical or horizontal centerline thereof, to facilitate the assembly of the bearing ring 422 about the disc valve member 130. The outer periphery 424 is arcuately shaped, as shown in FIG. 9, to facilitate the rocking insertion of the disc valve member 130 into the bore 38d of the valve body 12d with the bearing ring 422 in an assembled position thereabout.

An upper aperture 430 is formed through an upper portion of the bearing ring 422, the upper aperture 430 being sized to receive the second valve stem 146, in a manner to be more fully described below. A lower aperture 432 is formed in a lower portion of the bearing ring 422, the lower aperture 432 being sized to receive the third valve stem 152, in a manner to be more fully described below.

The valve assembly 10d also includes a pair of sleeve bearings 434, each of which are constructed of a suitable bearing material, such as Teflon. One sleeve bearing 434 is disposed about a portion of the second valve stem 146, and the other sleeve bearing 434 is disposed about a portion of the third valve stem 152. The sleeve bearings 434 are each sized to bearingly engage the adjacent portions of the respective valve stem 146 or 152.

In the assembled position and as shown in FIG. 9, the upper aperture 430 of the bearing ring 422 is sized to encompass the sleeve bearing 434, which is disposed about the second valve stem 146, and to retain that sleeve bearing 434 in an assembled position about the second valve stem 146. The lower aperture 432 is sized to encompass the sleeve bearing 434, which is disposed about the second valve stem 152, and to retain that sleeve bearing 434 in an assembled position about the third valve stem 152.

An annular groove 436 is formed in the end face 426 of the bearing ring 422, intersecting a portion of the inner periphery thereof. A second annular groove 438 is formed in the end face 428 of the bearing ring 422, intersecting a portion of the inner periphery thereof. A second annular groove 438 is formed in the end face 428 of the bearing ring 422, intersecting a portion of the inner periphery thereof. The annular grooves 436 and 438 are each sized and disposed to receive a portion of a seal ring and to cooperate therewith, in a manner which will be more fully described below.

A retaining ring 440 is slidingly disposed in one end of the bore 38d of the valve body 12d, and has an inner periphery 442, a valve member end 444, and a nonvalve member end 446. The retaining ring 440 is sized such that in the assembled position, as shown in FIG. 9, the valve member end 444 thereof engages the end 428 of the bearing ring 422 and cooperates with the valve member end 412 of the flange ring 410 to secure the valve member 130 in an assembled position in the bore 38d of the valve body 12d. In this position, the nonvalve member end 446 is coplanar with the end 36 of the valve body 12d. A seating surface 447 is formed on a portion of the valve member end 444 of the retaining ring 440, generally adjacent and intersecting the inner periphery thereof. The seating surface 447 is shaped and disposed to seatingly engage the seating surface 142 of the disc valve member 130, in one position thereof.

An annular groove 448 is formed in the nonvalve member end 446 of the retaining ring 440, intersecting a portion of the outer periphery thereof. An O-ring seal member 450 is disposed in the groove 448, and is sized to sealingly engage a portion of the end face 22 of the flange 18, an adjacent portion of the valve body 12d and an adjacent portion of the retaining ring 440, thereby forming a fluidtight seal therebetween.

An annular L-shaped recess 452 is formed in the valve member end 444 of the retaining ring 440, intersecting an adjacent portion of the inner periphery 442 thereof. The recess 452 is sized and disposed in the retaining ring 440 to cooperate with a seal ring 454, in a manner to be more fully described below.

In a preferred form the seal rings 418 and 454 are constructed similar and, as shown more clearly in FIG. 10, each seal ring 418 and 454 includes a valve member end 456 and a nonvalve member end 458. A seating surface 460 is formed on the inner periphery of each seal ring 418 and 454, and each seating surface 460 is sized to sealingly engage the seating surface 142 of the disc valve 130, in one position of the disc valve 130.

A flange portion 462 is formed on the outer periphery of each seal ring 418 and 452, and each flange portion 462 extends a distance axially from the nonvalve member end 458 of the respective seal ring 418 or 454. The flange portion 462 of the seal ring 418 is sized to extend a distance axially into a portion of the L-shaped groove 416 formed in the flange ring 410. The flange portion 462 of the seal ring 454 is sized to extend a distance axially into the L-shaped recess 452 of the retaining ring 440.

As shown in FIG. 9, an O-ring 464 is disposed in a portion of the L-shaped recess 416 of the flange ring 410, and the O-ring 464 is sized to sealingly engage the adjacent portions of the flange ring 410 and the adjacent portion of the flange 462 of the seal ring 418. An O-ring 466 is disposed in a portion of the L-shaped recess 452 of the retaining ring 440, and the O-ring 466 is sized to engage an adjacent portion of the retaining ring 440 and a portion of the flange portion 462 of the seal ring 454, thereby forming a fluidtight seal therebetween.

OPERATION OF FIGS. 9 AND 10

The valve assembly 10d will operate similar to the valve assemblies 10 and 10a described before. In fact, the disc valve member 130 is rocked into an assembled position in a manner similar to that described before with respect to the valve assembly 10a. One difference being that in the embodiment of the invention shown in FIG. 9, the bearing ring 422 is shaped such that the bearing ring 422 and the sleeve bearings 434 can be assembled about the disc valve member 130 prior to the disc valve member 130 being rocked into the assembled position.

When the disc valve member 130 has been rotated to the closed position, as shown in FIG. 9, the seating surface 460 of the seal ring 418 will sealingly and seatingly engage the seating surface 142 about the disc valve member 130, thereby preventing the flow of fluid to the valve assembly 10d. It should also be noted that the valve assembly 10d is adapted to sealingly engage the disc valve member 130 in two positions of the disc valve member 130. More particularly, in the closed position of the disc valve member 130, as shown in FIG. 9, the disc valve member 130 is sealingly engaged by the seal member 418, in a manner as described above. When the disc valve member 130 is rotated to a position, 180° from that shown in FIG. 9, the disc valve member 130 will be sealingly engaged by the seal member 454. It is therefore apparent from the foregoing that the disc valve member 130 may not only be rotated to a closed position wherein the optimum sealing engagement is effected, but also has an additional seal assembly that may be utilized in the event one of the seal members 418 or 454 is destroyed or otherwise becomes ineffective.

Thus, the valve assembly 10d retains most of the advantages of the valve assemblies described before, and in addition provides a valve assembly having an offset disc valve member, wherein the disc valve member may be rotated to alternate closed positions, to provide optimum sealing effectiveness between the disc valve member and the seat.

EMBODIMENT OF FIGS. 11 AND 12

The valve assembly 10e, shown in FIG. 11, is constructed similar to the valve assemblies described before, the salient differences being the upstream and downstream seat assemblies 500 and 502 and the modified housing 12e.

The housing 12e includes a radially inwardly extending flange ring 504, generally adjacent the end face 36e thereof. The flange ring 504, has an inner periphery 505, a valve member end 506 and a nonvalve member end 508. The nonvalve member end 508 is coplanar with the end face 36e of the valve body 12e. An annular groove 510 is formed in a portion of the valve member end 506, intersecting a portion of the inner periphery 505 of the flange ring 504. An O-ring seal member 511 is disposed in a portion of the annular groove 510, and the O-ring 511 and the groove 510 are shaped and adapted to cooperate with the downstream seat assembly 502, in a manner to be more fully described below.

An annular recess 512 is formed in the end face 36e of the valve body 12e, and an O-ring seal member 514 is disposed in the recess 512. The O-ring seal member 514 is sized to sealingly engage the adjacent portions of the valve body 12e, and a portion of the end face 22 of the flange 18.

A counterbore 516 is formed in the end face 34e of the valve body 12e, and an O-ring seal member 518 is disposed in the counterbore 516. The O-ring 518 is sized to sealingly engage the adjacent portions of the valve body 12e, and a portion of a retaining ring 520.

The retaining ring 520 has an inner periphery 522, a valve member end 524 and a nonvalve member end 526. A flange portion 528 is formed on the outer periphery of the retaining ring 520, generally adjacent the nonvalve member end 526 thereof. The flange portion 528 extends radially outwardly from the retaining ring 520, and is sized to be interposed between the end face 34e of the valve body 12e and the end face 20 of the flange 16, when the valve assembly 10e is in the assembled position as shown in FIG. 11. It is apparent from the foregoing, that the O-ring seal member 518 sealingly engages the outer periphery of the retaining ring 520 and a portion of the flange portion 528 thereof.

An annular groove 530 is formed in the valve member end 524 of the retaining ring 520, intersecting a portion of the inner periphery 532 thereof. An O-ring seal member 522 is disposed in a portion of the annular groove 530, and the O-ring seal member 532 and the groove 530 are shaped and disposed to cooperate with the upstream seat assembly 500 in a manner to be described more fully below.

In the assembled position, shown in FIG. 11, the valve member end 524 of the retaining ring 520 contacts the end face 426 of the bearing ring 422. The retaining ring 520 thereby cooperates with the flange ring 504 to secure the disc valve member 130, having the bearing ring 422 disposed thereabout, in an assembled position, wherein the end face 428 of the bearing ring 422 contacts a portion of the valve member end 506 of the flange ring 504.

It is also apparent from the foregoing, that the inward axial movement of the flange ring 520 is limited by the valve body 12e cooperating with the flange 16 to secure the flange portion 528 of the retaining ring 520 in the assembled position. Therefore, the axial retaining thrust imposed on the bearing ring 422 is limited in a manner to prevent premature destruction thereof by an overtightening of the bolts 28 about the valve body 12e.

The upstream and downstream seat assemblies 500 and 502, in a preferred form, are constructed similar and, as shown more clearly in FIG. 12, each seat assembly 500 and 502 includes a seat ring 540, having a valve member end 542 and a nonvalve member end 544. A seating surface 546 is formed on a portion of the valve member end 542 of each retaining ring 540, and an annular groove 548 is formed on a portion of each seating surface 546. An O-ring seal member 550 is disposed in each annular groove 548, and each O-ring seal member 550 is sized and disposed to sealingly engage the seating surface 142 of the disc valve member 130, in one position of the disc valve member 130.

A radially outwardly extending flange portion 552 is formed on a portion of the outer periphery of each seat ring 540, generally adjacent to valve member end 542 thereof. Each flange portion 552 is sized to slidingly fit into the respective annular groove 436 or 438 of the bearing ring 422. In the assembled position, as shown in FIG. 11, the flange portion 552 of the upstream seat assembly 500 is sized to sealingly engage the O-ring seal member 532 in the retaining ring 520, and the flange portion 552 of the downstream seat assembly 502 is sized to sealingly engage the O-ring seal member 511 in the flange ring 504.

OPERATION OF FIGS. 11 AND 12

The valve assembly 10e will operate similar to the valve assemblies described before, and, in fact, the disc valve member 130 having the bearing ring 422 disposed thereabout, is rocked into an assembled position, similar to the valve assembly 10d, shown in FIG. 9.

The upstream and downstream seat assemblies 500 and 502 provide alternate seating and sealing surfaces for the disc valve member 130, in a manner similar to that described before with respect to the valve assembly 10d. It is therefore apparent that the valve assembly 10e retains most of the advantages of the valve assemblies described before, and in addition provides an alternate seating and sealing assembly.

It is therefore apparent that the valve assemblies described before provide an optimum balance between the desired stem bearing engaging area, the maximum port area, the maximum stem interconnecting engaging area, and the minimum valve body size. The valve assemblies described herein also provide a valve assembly having a secondary metal-to-metal sealing engagement formed between the first valve stem and the valve body, and yet a valve assembly which is adapted such that the disc valve member can be rockingly inserted into an assembled position in the valve body, thereby permitting a maximum stem engagement with the supporting bearing surfaces, without the necessity of having to enlarge the valve body. The valve assemblies described herein therefore assure a sufficient bearing contacting area between the bearing support assemblies and the valve stems and thus are adapted to carry increased stem loads without undue sacrifice to the port area through the valve assemblies.

It should also be noted that the valve assemblies described herein have a valve member which is quickly and easily inserted in the valve body in a manner reducing the assembly and disassembly thereof. This feature of course being particularly important during the manufacture and field repair of the valve assembly.

Changes may be made in the construction and arrangement of the parts or the elements of the various embodiments as disclosed herein without departing from the spirit and scope of the invention as defined in the following claims.

What is claimed is:

1. A valve for assembly between a pair of flanges, comprising:
   a valve body having opposite end faces shaped to mate with said flanges, a bore therethrough intersecting said end faces, and an aperture extending transversely therethrough intersecting said bore;
   a first valve stem journaled in said aperture;
   means securing the first valve stem in a position such that the inner end thereof is substantially coterminous with the wall of said bore;
   a valve member having diametrically opposed second and third valve stems thereon, the length of the valve member and the second and third valve stems, generally between the outermost end portions of the second and third valve stems, being greater than the diameter of the bore through the housing;
   the outer end of the second valve stem and the inner end of the first valve stem being shaped to provide a mating tongue and groove;
   said valve member and second and third valve stems being of a size such that the valve member may be tilted at an angle to the axis of said bore for partial connection of the first and second valve stems and then rocked into the valve body with the valve member and the third valve stem positioned in said bore; and
   bearing means insertably disposed in the housing bore journaly engaging the second and third valve stems, the portion of the second and third valve stems journaly engaged by the bearing means being disposed generally within the housing bore.

2. The valve of claim 1 wherein the bearing means comprises a ring having diametrically opposed apertures therein receiving the second and third valve stems, and wherein the outer periphery of the ring is curved substantially on the arc of a circle having its centerline extending at a right angle to the centerline of said bore when installed in the valve body, whereby the ring may be mounted on the second and third valve stems and rocked into said bore with the valve member.

3. The valve of claim 2 wherein the length of the ring is substantially equal to the length of said bore to engage said flanges and thereby support the valve member when the valve is assembled.

4. The valve of claim 2 wherein the length of the ring is less than the length of said bore, and characterized further to include a support ring in at least one end of said bore engaging one end of the bearing ring and the flange at the respective end of the valve body for supporting the valve member when the valve is assembled.

5. The valve of claim 4 characterized further to include a second support ring in the opposite end of said bore engaging the opposite end of the bearing ring and the remaining flange when the valve is assembled.

6. The valve of claim 2 characterized further to include a bearing sleeve in each aperture of the ring of a size to journal the respective valve stem therein.

7. The valve of claim 1 wherein the tongue is formed on the outer end of the second valve stem and the mating slot is formed in the inner end of the first valve stem.

8. The valve of claim 3 characterized further to include seal means on the ring sealingly engaging the second and third valve stems and the flanges when installed in the valve body to isolate the body from fluid controlled by the valve.

9. The valve of claim 1 wherein the first valve stem has an annular shoulder thereon facing away from the bore in the valve body and a mating annular shoulder in the valve body to provide a metal-to-metal seal of the first valve stem in the body.

10. The valve of claim 2 wherein the valve member is a disc having an annular seating surface aligned with the second and third valve stems, and a seat is carried by the ring sealingly engaging the seating surface on the disc when the valve is closed.

11. The valve of claim 1 wherein the valve member is a disc having an annular seating surface offset from the second and third valve stems, and characterized further to include a valve seat of a size to be positioned in said bore between one end face of the valve body and the bearing means to sealingly engage the seating surface in one position of the disc.

12. The valve of claim 11 characterized further to include a second valve seat of a size to be positioned in said bore between the bearing means and the opposite end face of the valve body to sealingly engage the seating surface of the disc in a second position of the disc.

13. A valve assembly between a pair of flanges, comprising:
   a valve body having opposite end faces shaped to mate with said flanges, a bore therethrough intersecting said end faces, and an aperture extending transversely therethrough intersecting said bore;
   a first valve stem journaled in said aperture;
   means securing the first valve stem in a position such that the inner end thereof is substantially coterminous with the wall of said bore;
   a valve member having diametrically opposed second and third stems thereon, the length of the valve member and stems generally between the outermost end portions of the second and third valve stems, being greater than the diameter formed by the bore through the valve body;
   the outer end of the second valve stem and the inner end of the first valve stem being shaped to provide a mating tongue and groove;
   said valve member and second and third valve stems being of a size such that the valve member may be tilted at an angle to the axis of said bore for partial connection of the first and second valve stems and then rocked into the valve body with the valve member and third valve stem positioned in said bore;
   a bearing sleeve journaled on each of the second and third valve stems the bearing means being insertably disposed in the housing bore, the portion of the second and third valve stems journaly engaged by the bearing means being disposed generally within the housing bore;
   means adapted to be positioned in said bore for supporting said bearing sleeves and preventing movement of the valve member axially in said bore when the valve is assembled.

14. The valve of claim 13 wherein said last-mentioned means includes a support ring between one end face of the valve body and said bearing sleeves having an outer diameter substantially corresponding to the diameter of said bore, a pair of partial apertures in one end thereof arranged to receive portions of said bearing sleeves, and an opposite end shaped and arranged to be engaged by the respective flanges.

15. The valve of claim 14 characterized further to include a second support ring extending from the opposite end face of the valve body and the first-mentioned support ring having an outer diameter substantially corresponding to the diameter of said bore, a pair of partial apertures in one end thereof arranged to receive portions of said bearing sleeves, and an opposite end shaped and arranged to be engaged by the respective flange.

16. The valve of claim 15 wherein the valve member has a pair of annular seating surfaces thereon arranged in spaced relation to mate with said support rings in one position of the valve member, and wherein each support ring has an annular seating surface thereon mating with the respective seating surface on the valve member when the valve member is in said one position.

17. The valve of claim 16 wherein the valve member has a port opening therethrough between the seating surfaces on the valve member.

* * * * *